United States Patent Office.

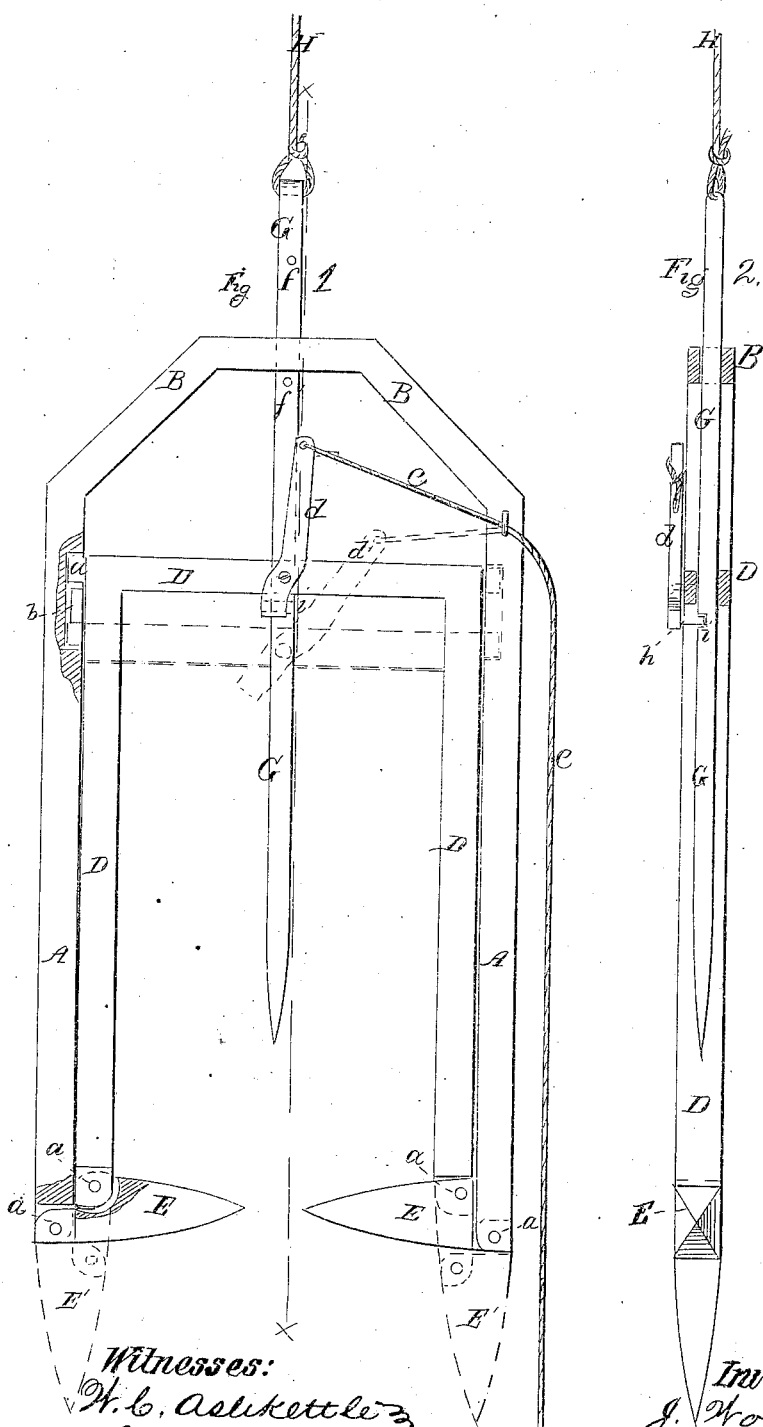

JONATHAN WOLFROM, OF YORK, PENNSYLVANIA.

Letters Patent No. 78,504, dated June 2, 1868.

IMPROVEMENT IN HORSE HAY-FORKS

*The Schedule referred to in these Letters Patent and making part of the same.*

TO ALL WHOM IT MAY CONCERN:

Be it known that I, JONATHAN WOLFROM, of York, in the county of York, and State of Pennsylvania, have invented new and useful Improvements in Horse Hay-Forks; and I do hereby declare that the following is a full, clear, and exact description thereof, which will enable those skilled in the art to make and use the same, reference being had to the accompanying drawings, forming part of this specification, in which—

Figure 1 is a front view of my improved hay-fork.

Figure 2 is a vertical section of the same, through the line $x\ x$, fig. 1.

Similar letters of reference indicate corresponding parts.

This invention relates to a machine for lifting a quantity of hay, the same being used to unload hay and the like, and attached to a rope, which is drawn by a horse in the manner common to horse hay-forks.

In the accompanying plate of drawings, the rigid tines are shown at A, continuous with or forming part of the cross-piece B, as shown.

The sliding frame D D D slides up and down within the tines A, by means of the projections $a$ from the frame D, which work in grooves or slots, $b$, in the tines A, as shown.

The points E are pivoted or jointed to the tines A and frame D, by open mortises in the ends of the tines A and tenons on the ends of the frame D, the said mortises and tenons being correspondent with the tenons and mortises of the points E, as shown.

The pivot-pins uniting these said points together are shown at $a\ a$.

Thus when the frame D is raised, the points E are brought in a horizontal, as shown in the drawing.

The red outlines E' show the position of the points when the same are in position for being thrust into the hay.

Thus, by the raising and lowering of the frame D, the points E are brought to a horizontal position suitable for holding the hay within the tines, and also to a downward position suitable for being thrust into the mass of hay in the mow or on the wagon.

The middle tine, G, works with easy contact through holes in the cross-piece B and the top of the frame D as shown, and to this tine the lifting-rope H is attached.

To the frame D a latch-lever, $d$, is pivoted, as shown, one end of which connects with tripping-line $e$.

At the upper end of said lever is a projection, $h$, which catches in a slot, $i$, in the middle tine G, as shown, or passes out from the said slot when the tripping-line is drawn.

This device is for the purpose of discharging the hay.

The mode of operation is as follows:

The hay-fork is seized by the upper parts, and the frame D is pushed downward to bring the points E, as shown by the red outline E.

The middle tine G is then pushed down to the extent of its movement, (which is limited by the pins $f\ f'$,) when the slot or notch $i$ will come opposite the projection at the end of the latch-lever.

The latch-lever is then brought vertical, which movement brings its projection to catch in the notch $i$.

The whole fork is then thrust downward into the hay.

When the lifting-strain comes upon the frame D, (as will be the case when the rope H is drawn, for the middle tine works freely through the hole in B, and is caught by latch-lever on the frame D,) the points E are brought to a horizontal position as shown, and the hay within the tines is thus held from falling out.

When the hay in the fork is to be discharged, the line $e$ is jerked, which disengages the lever $d$, and brings it to the position shown at $d'$, thereby permitting the frame D to slide downward and bring the points E straight.

This invention is simple and efficient, and has been found by practical trial to work in a more satisfactory manner than the similar double-tined forks.

I claim as new, and desire to secure by Letters Patent—

The tines A and frame D, substantially as shown and described, in combination with the points E, middle tine G, latch-lever $d$, and slot $i$, or the equivalent thereof, all as and for the purpose set forth.

JONATHAN WOLFROM.

Witnesses:
AMOS KIDD,
ABRAHAM LINEBAUGH.